(12) United States Patent
Ervin

(10) Patent No.: US 6,504,266 B1
(45) Date of Patent: Jan. 7, 2003

(54) METHOD AND APPARATUS FOR POWERING UP AN ELECTRONIC SYSTEM AFTER AC POWER HAS BEEN REMOVED

(75) Inventor: Joseph J. Ervin, Stow, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/484,093

(22) Filed: Jan. 18, 2000

(51) Int. Cl.$^7$ .................................................. H02J 3/00
(52) U.S. Cl. ............................ 307/29; 307/126; 700/286
(58) Field of Search ............................... 307/18, 19, 29, 307/126; 713/300, 340; 361/93.7, 18; 700/286, 291, 293, 295; 702/57, 58, 64

(56) References Cited

U.S. PATENT DOCUMENTS

| | | | |
|---|---|---|---|
| 3,300,648 A | * | 1/1967 | Rockefeller, Jr. et al. ... 307/126 |
| 3,379,893 A | * | 4/1968 | Cavanaugh .................. 307/34 |
| 3,617,812 A | * | 11/1971 | Deter .......................... 361/64 |
| 4,370,562 A | * | 1/1983 | Palazzetti et al. ............. 307/38 |
| 4,694,192 A | * | 9/1987 | Payne et al. .................. 307/34 |
| 4,720,758 A | * | 1/1988 | Winslow ..................... 323/274 |
| 4,951,171 A | * | 8/1990 | Tran et al. ................... 340/660 |
| 5,017,799 A | * | 5/1991 | Fishman ...................... 307/34 |
| 5,142,165 A | * | 8/1992 | Allard et al. ................ 307/130 |
| 5,191,520 A | * | 3/1993 | Eckersley .................... 307/35 |
| 5,268,850 A | * | 12/1993 | Skoglund .................... 700/297 |
| 5,317,366 A | * | 5/1994 | Koshi et al. ................. 307/31 |
| 5,483,656 A | * | 1/1996 | Oprescu et al. ............. 700/297 |
| 5,583,419 A | * | 12/1996 | Haller ......................... 307/19 |
| 5,604,421 A | * | 2/1997 | Barnsley ..................... 322/12 |
| 6,046,513 A | * | 4/2000 | Jouper et al. ................. 307/31 |
| 6,233,693 B1 | * | 5/2001 | Berglund et al. ........... 713/300 |
| 6,301,674 B1 | * | 10/2001 | Saito et al. ................. 700/293 |

FOREIGN PATENT DOCUMENTS

| | | | | |
|---|---|---|---|---|
| DE | 2343044 | * | 8/1973 | ............. H02J/3/24 |
| JP | 11-18295 | * | 1/1999 | ............. H02J/3/00 |

* cited by examiner

*Primary Examiner*—Brian Sircus
*Assistant Examiner*—Roberto J. Rios
(74) *Attorney, Agent, or Firm*—Kudirka & Jobse, LLP

(57) ABSTRACT

In an electronic system with multiple power supplies, a method and apparatus dynamically determines the number of power supplies required to power up the system without overloading any supply. The individual power supplies do not turn on until the determined number of power supplies have received AC power and become operational before attempting a complete system power on. The amount of required power is determined before power up based on the actual power load present. The actual load is determined by sensing load indicators in each load device and computing the total power load. The amount of power from supplies which have received AC power is determined by detecting when AC power has been applied to each power supply and computing the total amount of power available. System power up is delayed when the number of power supplies which have received AC power is insufficient to power the system without an overload situation occurring.

32 Claims, 5 Drawing Sheets

METHOD AND APPARATUS FOR POWERING UP AN ELECTRONIC SYSTEM AFTER AC POWER HAS BEEN REMOVED

FIELD OF THE INVENTION

This invention relates to the power up of an electronic system in response to the application of AC power and, more particularly, to power up of a system which has multiple independent power supplies.

BACKGROUND OF THE INVENTION

In many electrical systems, such as computers, it is often desirable to have several independent power supplies operational in the system simultaneously. The term "independent" is used here to mean, among other things, that each supply has its own connection to the main AC power source and produces all, or a portion of, the total DC power which is used to run the system. In most cases, however, the DC power outputs of the power supplies are connected in parallel. There are several advantages inherent in multiple supplies.

For example, the ability to add power supply units to the system after the initial configuration allows the number of power supply units to be tailored in accordance with system power requirements. In a computer system with pluggable units such as CPU's, memory, I/O cards, and disk drives, the power consumption of the system may vary dramatically depending on the current set of installed units. The number of power supplies that are installed can be selected to match the actual power load.

Further, extra power supplies can be added for redundancy. In contemporary terminology, systems can be made "N+1" redundant with respect to the power subsystem by adding one more power supply than is actually needed to run the system. In the event of the failure of one supply, such systems can continue operating normally while the failed supply is being replaced.

In general, it is often required that, following a loss, and subsequent reapplication, of the main AC power, the system remain in the same state that it was in before power was removed. In other words, the system must have some facility for remembering the state of its power supply subsystem (ON or OFF) at the time of the AC removal, so that, following the reapplication of AC power, the system can resume its previous state. The removal of AC power could occur either intentionally when the system is powered up or unintentionally in the case of an AC power failure. If the system was "ON" before the power removal, it is often necessary for the system to correctly power up and resume normal operation.

However, when such a system has multiple power supply units and each unit has an independent connection to the main AC power, a difficulty can arise in correctly recovering from a temporary lapse of the main AC power. In particular, since each power supply has its own connection to AC power, it will recover when AC power is applied and it is possible that the separate AC power connections might not recover simultaneously.

For example, consider a system with "M" independent power supplies which, while in the "ON" state, loses AC power. Further, assume that the system requires at least "N" operational power supplies to power it, where "N" is less than or equal to "M". Depending on the source and routing of AC power in the facility where the system is located, it is possible that the "M" power supplies may experience the reapplication of AC power at different times, or "steps" over several seconds or longer. This staggered power application could be due either to fault conditions in the facility, or to a controlled reapplication of AC power via circuit breakers.

When power is reapplied, if "L" power supplies receive AC power in the first such "step", where "L" is less than "N", then the power consumption requirements of the system will exceed the capabilities of the "L" supplies and the operational power supplies will be overloaded. In this situation, the operational power supplies experience over-current faults. Typically, once a power supply enters such an over-current fault state, it must be manually serviced before it will again attempt to power the system. This service can be accomplished by manually turning the supply OFF and then ON again.

At the next "step" in the facility's recovery of AC power, and at each subsequent "step", if less than "N" supplies receive AC power at the same time, then they will also enter an over-current state. Thus, it is possible for all the supplies in the system to enter the over-current fault state, in two or more steps. Most system designs would require manual intervention once in this state before the system could be successfully powered up.

SUMMARY OF THE INVENTION

In accordance with the principles of the invention, a method and apparatus dynamically determines the number of power supplies required to power up a system without overloading any supply. The power subsystem is required to wait until the determined number of power supplies has received AC power before attempting a system power on.

In accordance with one embodiment, the amount of required power is determined before power up based on the actual power load present. The actual load is determined by sensing load indicators in each load device and computing the total power load.

In accordance with another embodiment, the number of power supplies which have received AC power is determined by detecting when AC power has been applied to each power supply and computing the total amount of power available for power up.

In accordance with a further embodiment, power up is delayed when the number of power supplies that have received AC power is insufficient to power the system without an overload situation occurring.

BRIEF DESCRIPTION OF THE DRAWINGS

The above and further advantages of the invention may be better understood by referring to the following description in conjunction with the accompanying drawings in which.

DETAILED DESCRIPTION

Figure 1:
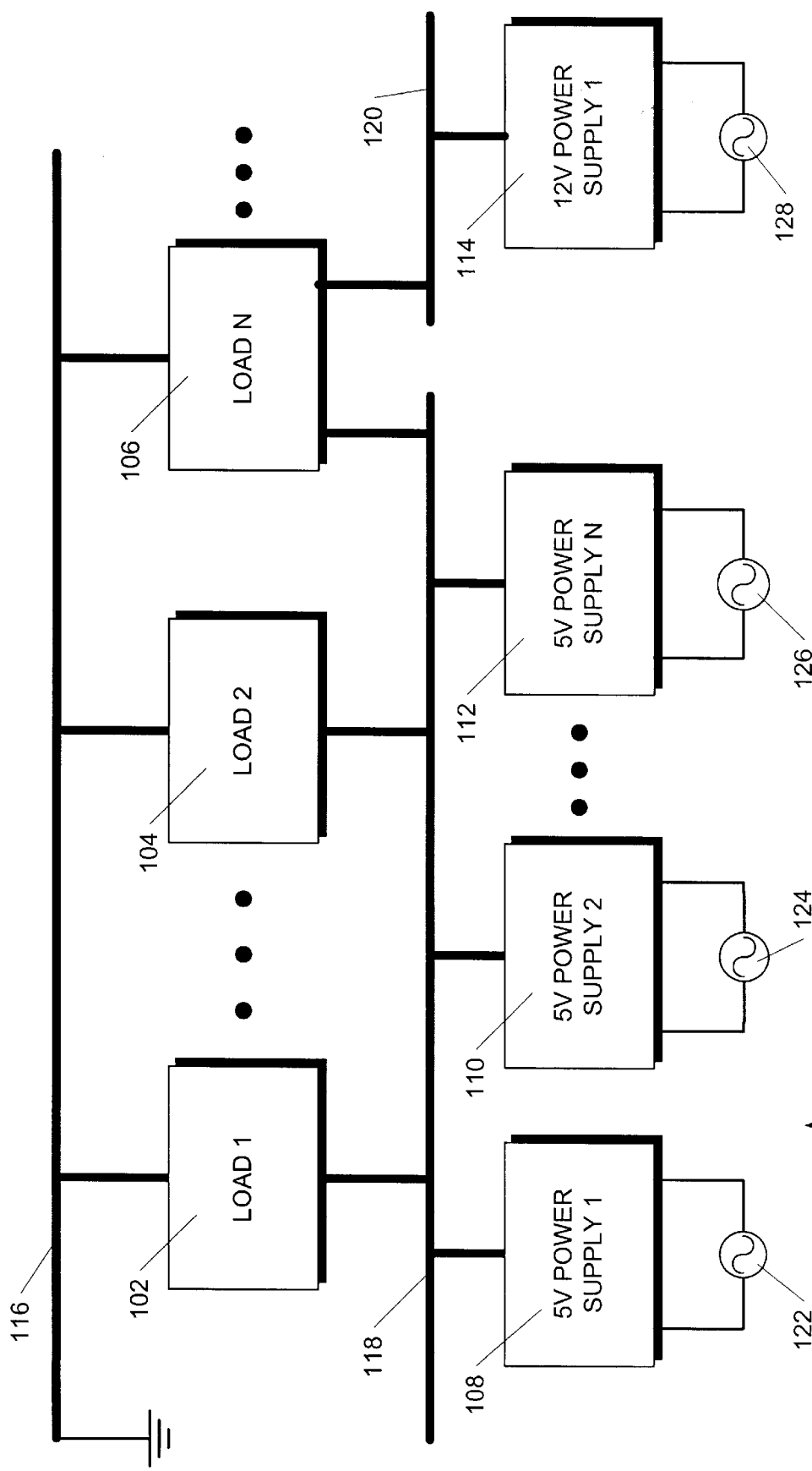
FIG. 1 is a block schematic diagram of a prior art electronic system with multiple power supplies.

FIG. 1 is an illustrative diagram of a prior electronic system 100 that has multiple power supplies of which supplies 108, 110, 112 and 114 are shown. Such a it system 100 typically has multiple load devices, such as load devices 102, 104 and 106. In a computer system, such load devices might consist of CPUs, memory or I/O devices. In other electronic circuits, the load devices might be DSPs, data processing devices or other electronic devices. Each load device is connected to a ground bus 116 and to one or more power busses or "rails" 118 and 120. In a simple electronic system, a single power bus with a single voltage may be used, whereas in more complicated electronic systems, such as that shown in FIG. 1, several power busses 118 and 120 may be present with different voltages. For example, in a typical computer system, the power supplies might produce 5 volts, 12 volts, 3.3 volts and other voltages.

Depending on the power drain at each voltage, some busses, such as bus 118 in FIG. 1, can have two or more power supplies connected in parallel to the bus 118 in order to provide for sufficient total current output to prevent any of the power supplies from overloading due to an overcurrent condition. In FIG. 1, multiple power supplies are connected to bus 118 of which three, 108, 110 and 112 are shown. Other busses may have only a single supply, such as bus 120 in FIG. 1 that has only supply 114 connected to it.

Each of supplies 108,114 is connected to AC power illustrated as AC power sources 122, 124, 126 and 128. Generally, each power supply would have its own direct connection to an AC power main (via circuit breakers, not shown.) In this manner, a failure in one supply will still leave other supplies operational as long as AC power is present.

Figure 2:
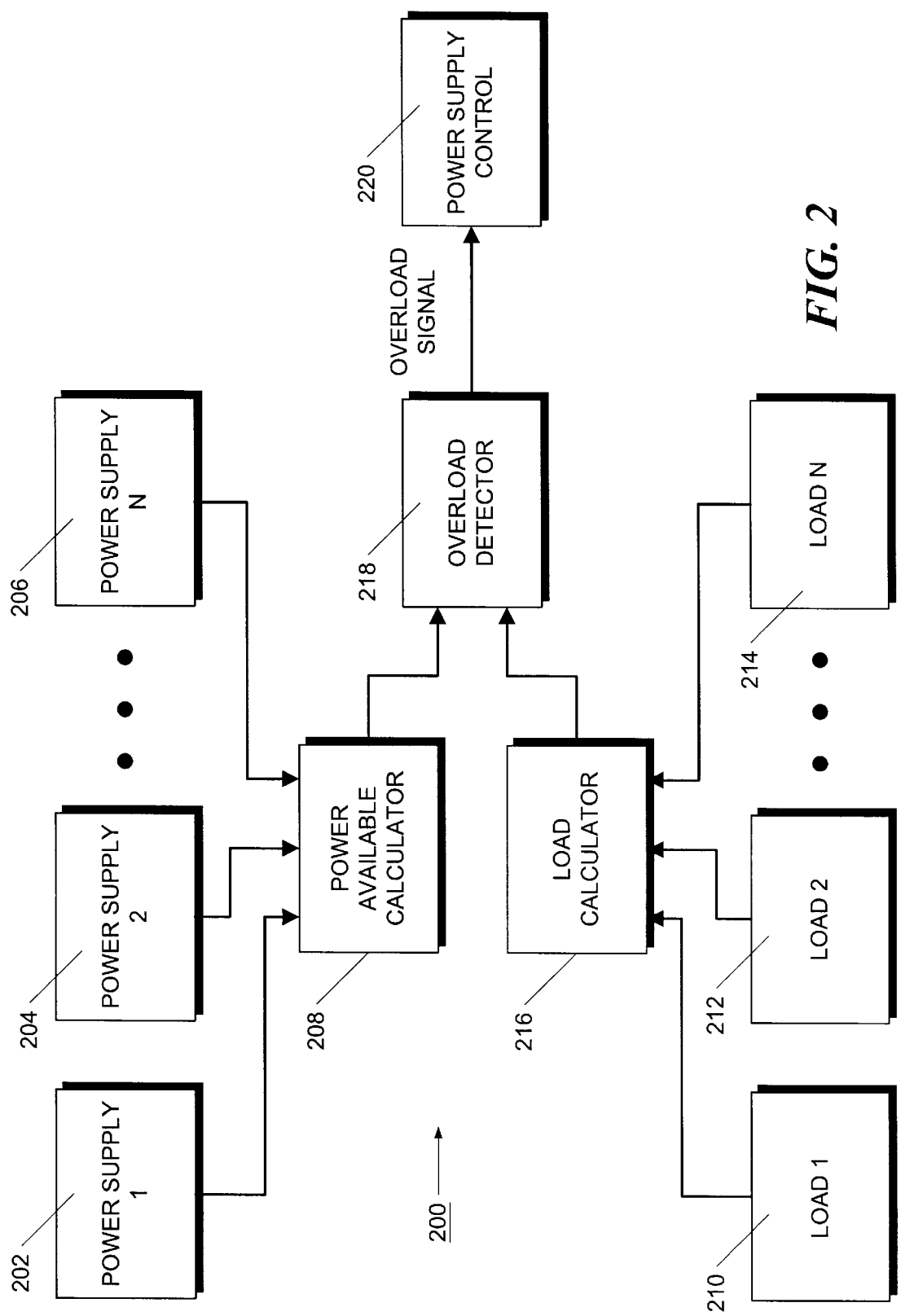
FIG. 2 is a block diagram of a power control system constructed in accordance with the principles of the present invention.

FIG. 2 illustrates an electronic system with a power application or failure recovery system constructed in accordance with the principles of the present invention. In the electronic system 200 illustrated in FIG. 2, the actual power distribution busses and AC power supplies have been omitted for clarity, but these elements would be constructed as shown in FIG. 1. The inventive system operates by dynamically calculating before power up both the power potentially available and the power required and delaying power up until sufficient power is available so that no power supply will overload.

Specifically, each of power supplies 202–206 generates a power available signal when it is operational and available to provide power. Generally, the supply will be available to provide power when AC power is applied to it. The power available signal generated by each power supply is representative of the total amount of power the supply can provide to a specified power rail without going into an overload condition. The power available signals generated by each power supply are provided to a power available calculator 208 that generates an indication of the total available power. The total available power may change over time as more and more power supplies receive AC power and turn on.

In a similar manner, each of power loads 210, 212 and 214 generates a power-required signal that indicates the amount of power required by that load. The power use of the system may vary as loads are added or removed from the system. The power required signals are provided to a load calculator 216 which computes the total amount of power required by the current system configuration.

The outputs of calculators 208 and 216 representing the total power available and the total power required are provided to an overload detector 218 which compares the total power available to the total power required. The overload detector 218, in turn, generates an input to a power supply control 220. If the result of the overload calculation indicates that there is sufficient power to turn on the system, then the power control circuitry 220 allows the system to come up normally. If, however, the overload computation determines that there is insufficient power available to safely power on the machine, the power control circuitry 220 will block any "power on" command coming from other circuitry (not shown) in the system 200. This operation prevents system power up until the available power meets or exceeds the power required.

The power available signals and the power required signals could be generated in a number of ways. At the beginning of the power on procedure, the power supplies 202–206 are not yet powered on so that the voltage normally provided to the system 200 by the power supplies 202, 204 and 206 is not present even though AC power may be provided to one or more of the power supplies. However, in accordance with a preferred embodiment, the power supplies in system 200 are designed to include a standby power source, which generates a reduced level output whenever any of the power supplies receives AC power. Many conventional personal computers have such standby power sources and these sources are also present in several larger computer systems, such as those designed and manufactured by Sun Microsystems, Palo Alto, California. Power supply designs in these systems have migrated toward the use of "soft" power on/off controls. In such designs, instead of physical switches that turn the AC power completely on or completely off, AC power is always present. The power supplies have circuitry that is powered and functional even when the unit appears to be "off." For example, most modern televisions have circuitry that is powered and functional at any time the television is receiving AC power; this circuitry detects a "power-on" command from a remote control and turns on the main power supplies.

In accordance with the preferred embodiment, the mechanisms which generate the power available and power required signals and the calculators and detectors are powered from one or more of these standby power sources. The mechanisms are designed to have very modest power requirements. As such, they require that AC power be provided to only a single power supply in order to generate all needed standby power. The standby power can be used to perform the power and load calculations and postpone an attempted power-on until enough power supplies are receiving AC power such that the electrical load presented to the power supplies by the system will not overload the power supplies.

More particularly, the available power signal generated by each power supply and the power-required signal generated by each load are generated by a single resistor in each power supply or load. This resistor is connected to the standby power and its value is selected to indicate the power that the supply is able to supply or the power that the load consumes. The physical connector which connects each power supply or load unit to the main system must dedicate a single "power configuration" pin over to which this resistor is connected to allow the power information to pass to the power computation mechanism. The system itself may also contain a single resistor to indicate to the power consumption circuitry the power consumption of the non-removable parts of the system.

Figure 3:
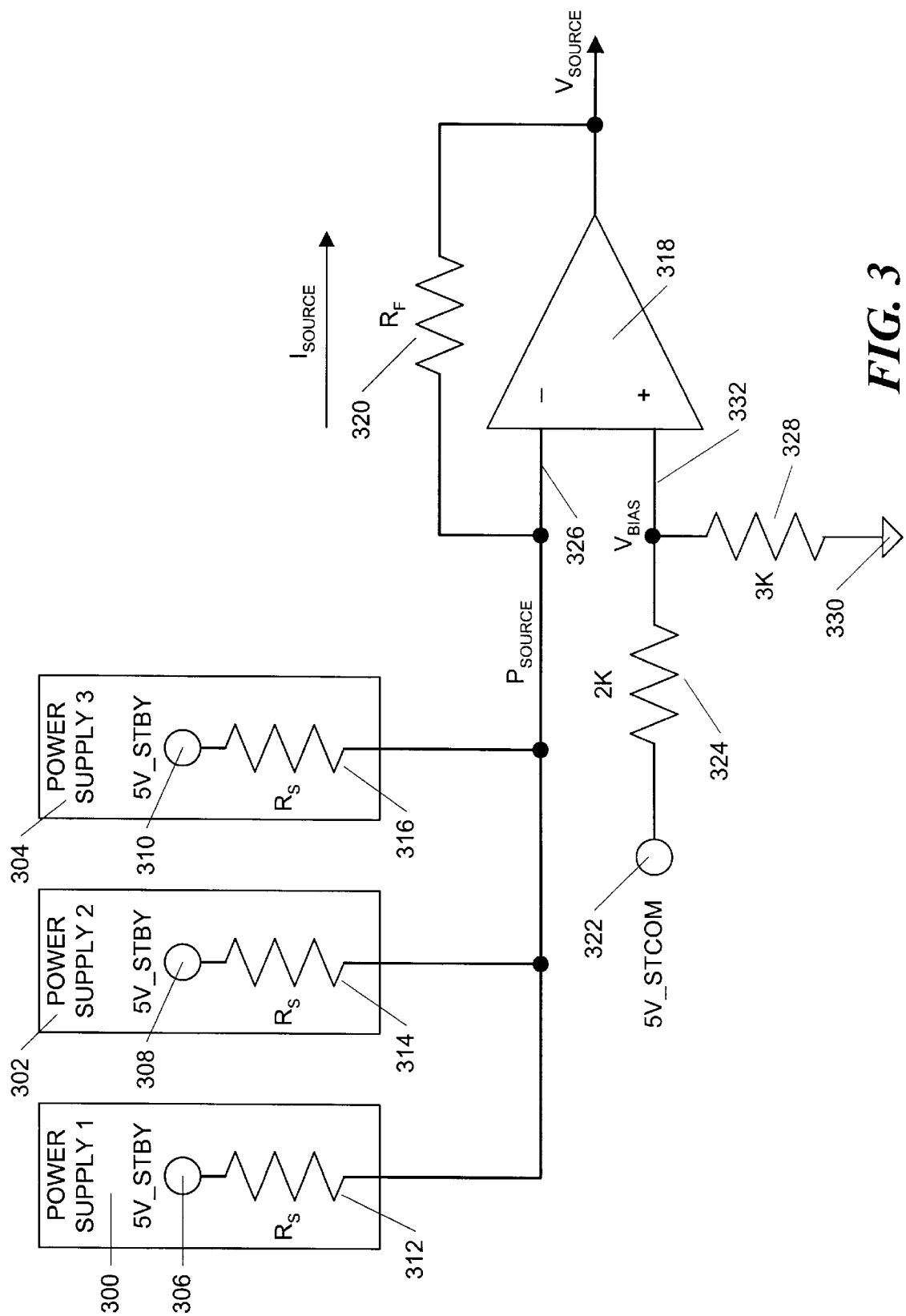
FIG. 3 is a circuit diagram of an illustrative circuit that computes the amount of available power.

An example of an analog circuit that can be used to compute the available power it is shown in FIG. 3. In FIG. 3, three power supplies are shown, however, more or fewer power supplies can be used without departing from the spirit and scope of the invention. The standby power source is a 5 volt source denoted as "5V_STBY". In the case of power supplies, the standby source for each power supply is the standby source associated with that power supply so that standby power for a power supply becomes available when AC power is applied to that power supply. Although not shown in FIG. 3, these individual standby sources are also connected together to form a common standby source 5V_STCOM which can provide power when any of the power supplies receives AC power.

More specifically, power supplies 300, 302 and 304 each contain a single supply indicator resistor 312, 314 and 316, respectively, which is connected on one end to a 5V_STBY standby source for the respective power supply, 306, 308 and 310. The other end of each supply indicator resistor 312, 314 and 316 is connected to the available power calculator via the aforementioned power configuration pin. The power configuration pins of the three power supplies are connected together, creating a net, labeled as "$P_{SOURCE}$" which is connected to the negative input 326 of amplifier 318. When each source receives AC power, a current runs through the corresponding supply indicator resistor. Since the resistors are selected to represent the power source available power, with the particular summing amplifier configuration illustrated in FIG. 3, the current will also be proportional to the available power. In FIG. 3, each power supply has a supply indicator resistor with the same value, $R_S$, but this need not necessarily be the case. The circuitry works equally well for supplies of varying capacity, with a corresponding change in the supply indicator resistor of each supply. Although not shown in FIG. 3, it may be necessary with some power supplies to place a diode in series with the supply indicator resistor for that supply to prevent a supply that does not have AC power from leaking current away from the $P_{SOURCE}$ net, as this would corrupt the information on the available power, which is encoded as current.

The currents from the three supplies add to create a current "$I_{SOURCE}$", which flows through the feedback resistor 320 labeled as $R_F$. The output voltage, $V_{SOURCE}$, of the summing amplifier 318, is given as a function of $R_F$, $V_{BIAS}$, and the supply indicator resistors, $R_S$. It should be noted that, since the summing amplifier 318 configuration is "inverting" in nature, the output voltage, $V_{SOURCE}$, will decrease in value with an increase in $P_{SOURCE}$ and a corresponding increase in $I_{SOURCE}$. For this reason, the circuit is biased to a positive voltage chosen high enough to give the circuit a reasonable dynamic range, and low enough to meet the DC specifications of the amplifier 318. Although not shown in FIG. 3, it is assumed that the amplifier 318 is powered from the common 5V_STCOM standby source 322. For that reason, amplifier 318 is held at a bias voltage $V_{BIAS}$ on the "+" input 332 of the amplifier 318 by a voltage divider comprising resistors 324 and 328 connected between supply 322 and ground 330. With the values shown, $V_{BIAS}$ is approximately 3 volts.

The relationship between $R_F$ and $R_S$ is computed, assuming three identical power supplies 300, 302 and 304. First, $V_{SOURCE}$ is chosen to be zero volts when all three supplies have received AC power and have turned on. This gives a ratio of $R_F/R_S=\frac{1}{2}$. Next, a value for $R_F$ is chosen, for example, 1K ohms, which dictates a value for $R_S$ of 2K ohms, and the resulting $V_{SOURCE}$ computed for 0, 1, 2, and 3 supplies present giving values of 3, 2, 1 and 0 volts, respectively. The mathematics for power supplies of dissimilar power capabilities is straightforward and not shown.

Figure 4:
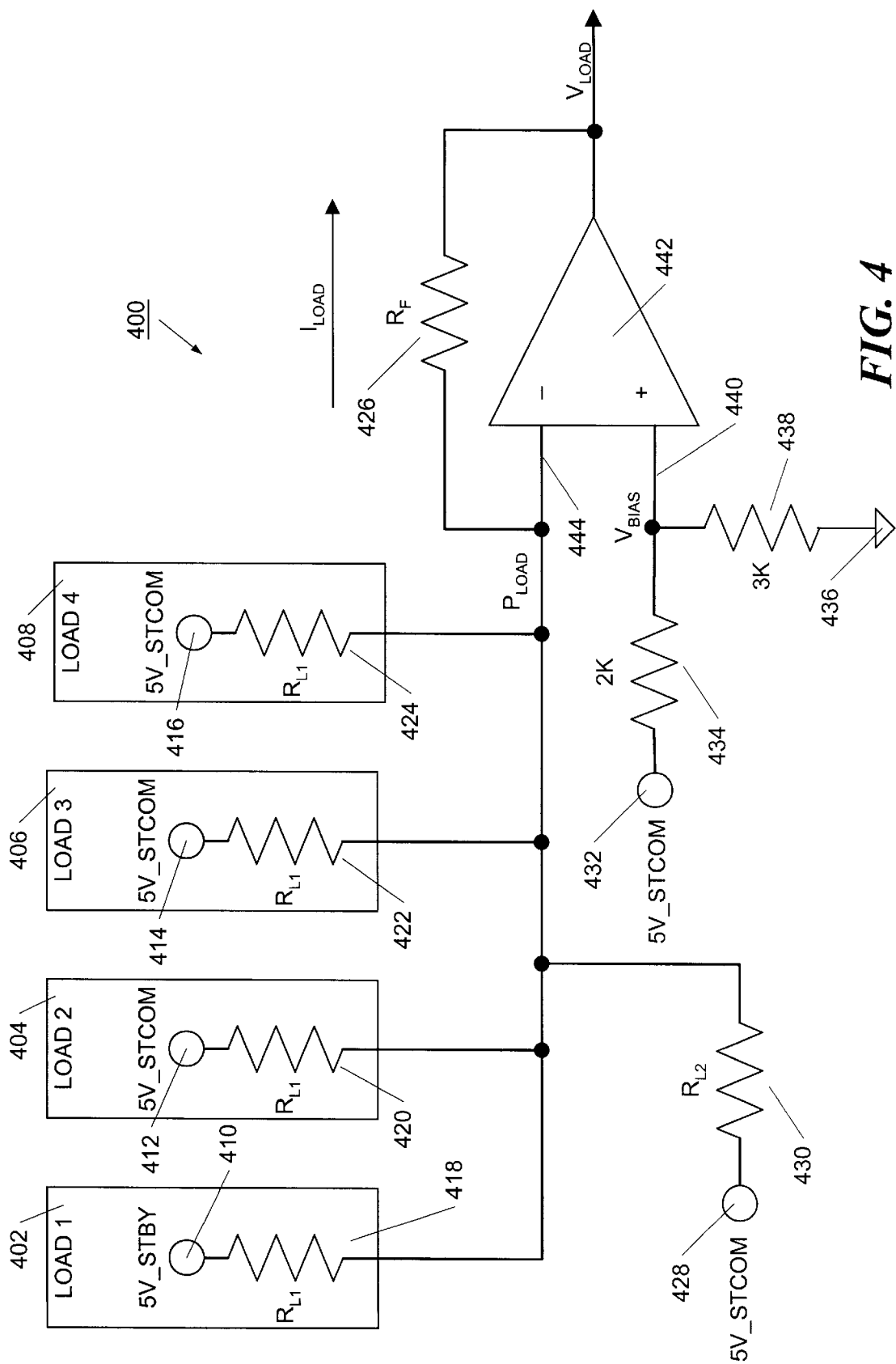
FIG. 4 is a circuit diagram of an illustrative circuit that computes the load present upon power up.

FIG. 4 shows an illustrative implementation of the "load calculator" mechanism, which computes the total load present. It is very similar in topology to the circuit that creates the $V_{SOURCE}$ signal. The load indicator resistors 418–424 contained within the removable loads 402–408 are designated with a value of $R_{L1}$, and are connected to the common standby source 5V_STCOM indicated as sources 410–416. Although the load indicator resistors 402–408 are shown with equal values, they could also be selected to have values that differ when the load values differ.

The load indicator resistors are connected together to form the $P_{LOAD}$ net. Consequently, with the particular summing amplifier configuration illustrated in FIG. 4, current running into the $P_{LOAD}$ net is proportional to the power required by the removable load boards. The load indicator resistor 430 with a value $R_{L2}$ may also be provided which is connected to the common standby source 428 and provides current to the $P_{LOAD}$ net which current is proportional to the power consumed by the non-removable portion of the main system, i.e., the part that is always present. Thus, the total current on the $P_{LOAD}$ net, represented here by $I_{LOAD}$ is proportional to the total load of the system. Note that, since the load indicator resistors are connected to the common standby source, the current $I_{LOAD}$ representing the entire load in the system will be available as soon as any power supply receives AC power.

Although not shown in FIG. 4, it is assumed that the amplifier 442 is powered from the common 5V_STCOM standby source 432. For that reason, amplifier 442 is held at a bias voltage $V_{BIAS}$ on the "+" input 440 of the amplifier 442 by a voltage divider comprising resistors 434 and 438 connected between supply 432 and ground 436. With the values shown, $V_{BIAS}$ is approximately 3 volts.

Note that the $R_{L1}$, and $R_F$ resistor values in FIG. 4 must be chosen so that the voltage on $V_{LOAD}$ represents "watts of load per volt" with the same scale that the voltage on $V_{SOURCE}$ generated by the power available calculator illustrated in FIG. 3 represents "watts of power supply per volt." Only in this manner can the two voltages be compared in a meaningful way. The required resistor values can be chosen in the following manner:

1. Divide the dynamic range of the $V_{LOAD}$ output, which turns out to be $V_{BIAS}$ volts (in this configuration, the output of amplifier 442 can vary only between $V_{BIAS}$ and 0 volts), by the maximum power provided when all supplies have received AC power and are turned on. This result, denoted Av, relates the output $V_{LOAD}$ in volts to consumed power in watts.
2. Choose the value of $R_F$ in load circuit 400 at some arbitrary convenient value. Define the term $A_I$, which is defined as Av divided by $R_F$. This term relates the output voltage $V_{LOAD}$ in volts to the current $I_{LOAD}$ in amperes. Next, the load indicator resistance value ($R_{L1}$) in ohms is given by the following formula in which the load of the load device in watts is denoted by $P_{UNIT}$:

$$R_{LI} = \frac{5V\_STCOM - V_{BIAS}}{P_{UNIT} \times A_1}$$

Figure 5:
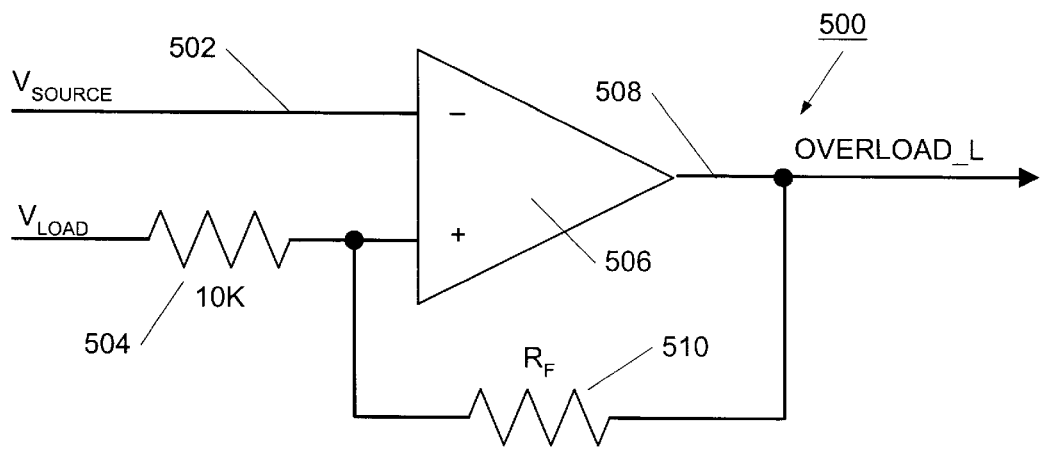
FIG. 5 is a circuit diagram of an illustrative circuit that determines whether an overload situation is present.

FIG. 5 shows an illustrative comparator circuit that compares the $V_{LOAD}$ and $V_{SOURCE}$ signals generated by the circuits described above. The comparator circuit 500 generates at its output 508 a low-true OVERLOAD_L signal, which when asserted LOW indicates that not enough power supplies are on-line with AC power. In particular, the $V_{SOURCE}$ signal is applied to the negative input 502 of operational amplifier 506 and the $V_{LOAD}$ signal is applied, via input resistor 504 to the positive input of amplifier 506.

The hysteresis resistor 510, denoted as $R_F$, works with the input resistor 504 to prevent the output OVERLOAD_L from oscillating when $V_{LOAD}$ and $V_{SOURCE}$ are nearly equal in value.

Figure 6:
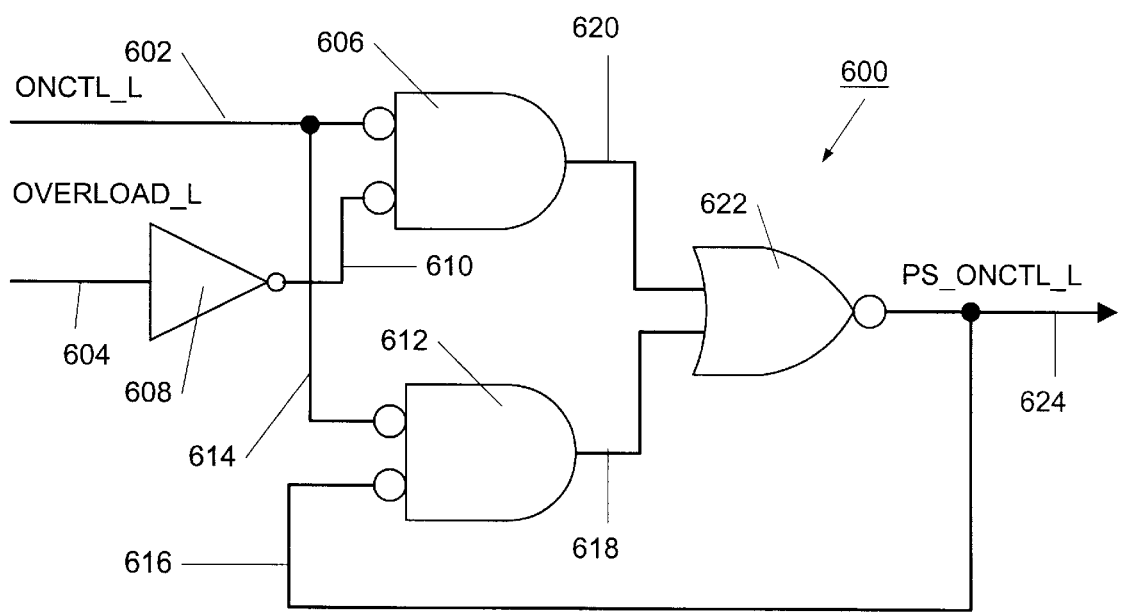
FIG. 6 is a circuit diagram of an illustrative circuit that controls power up to prevent an overload situation from occurring.

FIG. 6 illustrates a simple asynchronous state machine (ASM) which uses the OVERLOAD_L signal generated by the comparator illustrated in FIG. 5 to pass or block an ONCTL_L signal generated by the system. In the absence of this state machine the ONCTL_L signal would normally connect directly to the power supplies, turning them ON when ONCTL_L is LOW. The purpose of using an ASM rather than simple combinatorial logic is to prevent the power control circuit from turning the power supplies OFF, once it has been turned them ON. This choice has been made because power supplies typically provide their own overcurrent protection, and, as such, will power-off on their own in the event of a fault. This might be the case, for example, if a supply fails in a system configuration that is not "N+1" redundant. In this case, it is deemed better to let the overcurrent fault be recorded in the power supply, rather than to have the system powered off by the OVERLOAD logic. Either way, the system will power off. Also, there is the chance that the system will stay up even with the supplies operating in a slightly overcurrent condition. Consequently, the circuit illustrated in FIG. 6 prevents a system from transitioning from OFF to ON while OVERLOAD_L is TRUE (LOW).

Specifically, the ONCTL_L signal is provided to the upper input 602 of gate 606. The OVERLOAD_L signal is provided to the input 604 of inverter 608 and the resulting inverted signal is applied to the lower input 610 of gate 606. If the ONCTL_L signal is LOW indicating that the supplies should turn on and the OVERLOAD_L signal is HIGH, indicating no overload condition, then gate 606 will be enabled. The HIGH output produced by gate 606 is applied to the upper input 620 of NOR gate 622, which thereupon produces a LOW output 624 designated the PS_ONCTL_L output which turns on the supplies.

The LOW PS_ONCTL_L output is applied to the input 616 of gate 612. As long as gate 612 receives a LOW ONCTL_L signal on its upper input 614, indicating that the power supplies should remain ON, gate 612 will generate a HIGH output 618. When this HIGH output is applied to the lower input of NOR gate 622, it will keep the output PS_ONCTL_L LOW regardless of the state of the OVERLOAD_L signal.

The exemplary embodiment has the added feature that the linear proportional nature of the $V_{SOURCE}$ AND $V_{LOAD}$ signals allows a calculation of the amount of excess power available. If this latter amount of power exceeds the power available from the largest supply, then the system has N+1 redundancy. This latter power calculation is conventional and so is not described in detail herein.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in some implementations, the power source and load calculations may need to be performed separately for each power bus or rail, and thus the power source calculator and load calculator described above must be replicated for each power rail, depending on the power budget of the system. In addition, other mechanisms in addition to the circuitry shown can be used to perform the power and load calculations. For example, it would be possible to digitize the power available signals and utilize software to perform the power available, load and overload calculations. With some of these other configurations, the proportional nature of the signals might not be maintained. Other aspects, such as the specific circuitry utilized to achieve a particular function, as well as other modifications to the inventive concept are intended to be covered by the appended claims

What is claimed is:

1. Apparatus for powering up an electronic system after AC power-has been removed, the electronic system having a plurality of independent power supplies and a plurality of load devices and the apparatus comprising:

a load calculator which is operable before AC power has been applied to the electronic system and detects the power load of each of the plurality of load devices and computes the total power load;

a power available calculator which is operable before AC power has been applied to the electronic system and detects when AC power has been applied to each power supply and computes the total available power; and a power control circuit which delays system power up when the total available power is insufficient to power the total power load without an overload situation occurring in any power supply.

2. Apparatus according to claim 1 wherein the load calculator uses a load indicator in each load device to determine the power load of the load device.

3. Apparatus according to claim 2 wherein the load indicator is a resistor with a value selected to represent the power load of the load device.

4. Apparatus according to claim 1 wherein the power available calculator uses a power supply indicator in each power supply to determine when the supply is energized with AC power.

5. Apparatus according to claim 4 wherein the power supply indicator indicates the amount of power the supply can provide.

6. Apparatus according to claim 4 wherein the power supply indicator is a resistor with a value selected to represent the amount of power the supply can provide.

7. Apparatus according to claim 6 wherein the resistor is connected to a standby power source in the supply which is activated when AC power is applied to the supply.

8. Apparatus according to claim 1 wherein the available supply power of each of the plurality of power supplies is represented by a current whose value is related to the available supply power.

9. Apparatus according to claim 8 wherein the available supply power of each of the plurality of power supplies is represented by a current whose value is proportional to the available supply power.

10. Apparatus according to claim 8 wherein the power available calculator computes the total available supply power by adding currents representing the power available from each power supply.

11. Apparatus according to claim 1 wherein the power load of each of the plurality of load devices is represented by a current whose value is related to the power load.

12. Apparatus according to claim 11 wherein the power load of each of the plurality of load devices is represented by a current whose value is proportional to the power load.

13. Apparatus according to claim 11 wherein the load calculator computes the total power load by adding currents representing each load device.

14. Apparatus according to claim 1 wherein the power control circuit comprises a comparator which compares the total available power to the total power load.

15. Apparatus according to claim 14 wherein the comparator generates an overload signal when the total power load exceeds the total available power.

16. Apparatus according to claim 15 wherein the power control circuit further comprises an asynchronous state machine which turns the power supplies on when system power is requested and the overload signal indicates that the total available power is equal or greater than the total power load and which prevents the apparatus from turning off the power supplies in response to an overload signal after the power supplies have been turned on.

17. A method for powering up an electronic system after AC power-has been removed, the electronic system having a plurality of independent power supplies and a plurality of load devices and the method comprising:
   (a) before AC power is applied to the electronic system, detecting the power load of each of the plurality of load devices and computing the total power load;
   (b) before AC power is applied to the electronic system, detecting when AC power has been applied to each power supply and computing the total available power; and
   (c) delaying system power up when the total available power is insufficient to power the total power load without an overload situation occurring in any power supply.

18. A method according to claim 17 wherein step (a) comprises:
   (a1) using a load indicator in each load device to determine the power load of the load device.

19. A method according to claim 18 wherein step (a1) comprises using a resistor with a value selected to represent the power load of the load device.

20. A method according to claim 17 wherein step (b) comprises:
   (b1) using a power supply indicator in each power supply to determine when the supply is energized with AC power.

21. A method according to claim 20 wherein step (b1) comprises using the power supply indicator to indicate the amount of power the supply can provide.

22. A method according to claim 20 wherein step (b1) comprises using a resistor with a value selected to represent the amount of power the supply can provide.

23. A method according to claim 22 wherein step (b1) further comprises connecting the resistor to a standby power source in the supply which is activated when AC power is applied to the supply.

24. A method according to claim 17 wherein step (b) comprises:
   (b2) representing the available supply power of each of the plurality of power supplies by a current whose value is related to the available supply power.

25. A method according to claim 24 wherein step (b2) comprises:
   (b2a) representing the available supply power of each of the plurality of power supplies by a current whose value is proportional to the available supply power.

26. A method according to claim 24 wherein step (b) further comprises computing the total available supply power by adding currents representing the power available from each power supply.

27. A method according to claim 17 wherein step (a) comprises representing the power load of each of the plurality of load devices by a current whose value is related to the power load.

28. A method according to claim 27 wherein step (a) comprises representing the power load of each of the plurality of load devices by a current whose value is proportional to the power load.

29. A method according to claim 27 wherein the step (a) further comprises computing the total power load by adding currents representing each load device.

30. A method according to claim 17 wherein step (c) comprises comparing the total available power to the total power load.

31. A method according to claim 30 wherein step (c) further comprises generating an overload signal when the total power load exceeds the total available power.

32. A method according to claim 31 wherein step (c) further comprises using an asynchronous state machine to turn the power supplies on when system power is requested and the overload signal indicates that the total available power is equal or greater than the total power load and which to prevent the apparatus from turning off the power supplies in response to an overload signal after the power supplies have been turned on.

* * * * *